(No Model.)
J. M. CLARK.
COAL OIL BURNER OR HEATING APPARATUS.
No. 397,971. Patented Feb. 19, 1889.
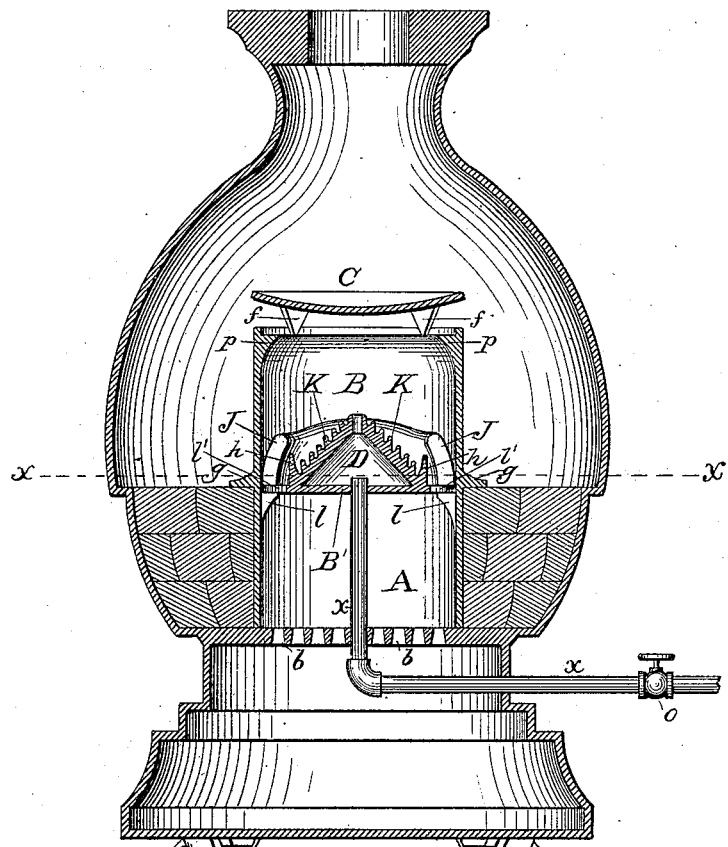
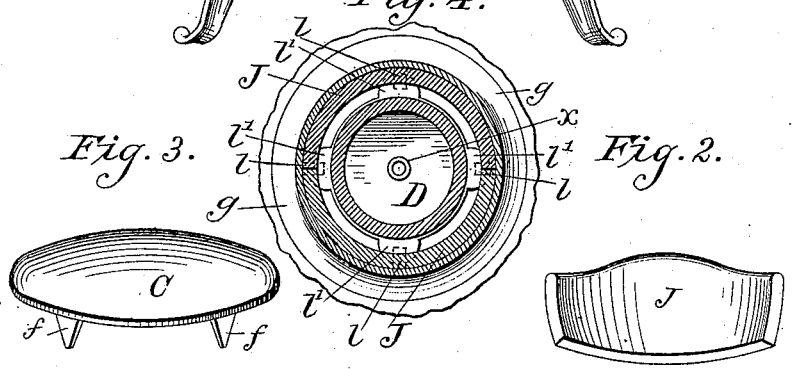
Witnesses:
Ross South
H. C. South
Inventor:
John M. Clark
by Phil T. South, atty

UNITED STATES PATENT OFFICE.

JOHN M. CLARK, OF DAYTON, OHIO, ASSIGNOR OF ONE-HALF TO C. L. HINTON, OF SAME PLACE.

COAL-OIL BURNER OR HEATING APPARATUS.

SPECIFICATION forming part of Letters Patent No. 397,971, dated February 19, 1889.

Application filed March 23, 1888. Serial No. 268,299. (No model.)

*To all whom it may concern:*

Be it known that I, JOHN M. CLARK, a citizen of the United States, residing at Dayton, in the county of Montgomery and State of Ohio, have invented a new and useful Coal-Oil Burner or Heating Apparatus for Stoves, &c., of which the following is a specification.

My invention relates to heaters for stoves, grates, and small furnaces, the object of which is to provide a simple and inexpensive device for heating and cooking purposes by the use of coil-oil alone, without the use of a wick or generating gas from the oil. I attain these objects by means of the mechanism set forth, which consists of the peculiar construction and combination of the parts hereinafter fully described, and specifically pointed out in the claim.

The figures illustrated in the accompanying drawings are: Figure 1 is a sectional view drawn through the center from top to bottom, the one half being removed. Fig. 2 is a front view of the joker. Fig. 3 is a top view of the hood, showing the jaws or lugs; and Fig. 4 is a transverse section of the burner on line $x$ $x$ of Fig. 1.

Similar letters refer to similar parts throughout the several views.

In the drawings, Fig. 1, I have shown my device inside of a stove, resting upon the bottom of the grate. A is the lower part of the shell. B is the upper part. B' is a cone-shaped burner, with receptacle D for the oil. $h$ is an upturned rim to prevent overflow of oil, with lugs $l'$. K are corrugated receptacles surrounding the outside and encircling the cone. C is a hood with broad lugs $f$, which are for the purpose of conducting flame under lids of cook-stove. J is the joker on opposite sides of the cone. $g$ is a rim encircling the outside of the shell. $l$ are lugs inside of the shell, upon which the burner rests. $p$ is a projecting inside rim around the top of the shell. $f\ f$ are lugs on the under side of the hood C. $l'\ l'$ are lugs extending out from the upturned rim of the cone, which supports it upon the lugs $l$, creating a vacuum for air to pass through between the rim of the cone and the inside of the shell. $b$ is a grate of a stove upon which the burner is placed, as shown in the figure. $x\ x$ is the pipe for conducting the oil from a tank into the receptacle D through an orifice at the bottom of the cone, which, passing out through the orifice at the top of the cone, spreads over the outside, filling the sunken corrugations surrounding the cone. $o$ is an angle-valve needle-point for controlling and regulating the flow of oil.

I do not use a wick, nor does the oil generate gas.

My device is made of metal.

In the manufacture of my burner I use a shell open at top and bottom, of any desired size in diameter and height, near the middle portion of which, on its outer sides, I have a projecting rim—say one inch or more—encircling the shell, for the purpose of supporting the heater inside of a stove, &c., when incased in fire-clay or other substance. On the inner sides of the shell, corresponding with the outer rim, I have lugs $l$, upon which the burner B' rests. The burner is cast hollow, as shown at D, which is the oil-receptacle. There is an orifice through the bottom of this burner, through which a pipe, $x\ x$, is placed, which connects with the oil-tank for the purpose of supplying the oil to the burner.

The object of the receptacle D in the cone is for the purpose of superheating the oil before it passes to the outside of the cone. In the top of the burner is another orifice, an outlet for the oil, which, running down over the sides of the cone, fills the corrugations therein which circle the cone, as shown at K. When the cone has been placed upon the inside of the shell, the lugs $l'$ on the cone rest upon the lugs $l$ on the inside of the shell. The two jokers J are then placed in position on opposite sides of the burner, resting against the sides of the shell. These jokers, being in flange shape, projecting toward the cone, direct the air into the flame, causing it to spread and circulate the heat through the upper part of the shell before it reaches the top. The rim $p$, encircling the inside of the top of the shell, is intended to direct the air toward the center. Upon the top of the shell the hood C, which is a concave, rests by means of jaws or lugs, which are of such length as to remove the under side of the hood a short distance from the top of the shell, so that the flame may easily pass out. I have made these lugs wide, so that in a cooking-stove they set toward the front and back of the stove, so dividing the flame that it passes immediately under the lids of the stove, giving an intense heat there before it is carried back over the oven. The shell from the outside rim is incased in fire-clay or other substance, thereby making the chamber air-tight, so that no air can enter the stove except that which passes up through the bottom of the shell.

Having thus described my invention, what I claim, and desire to secure by Letters Patent, is—

The combination, with a stove or furnace, of a coal-oil burner consisting of a shell, A B, provided with outside rim, $g$, inside rim, $p$, and lugs $l$, a cone, B′, having upturned rim $h$, with lugs $l'$, and corrugated circular depressions K, surrounding the same, said cone forming an oil-receptacle, D, the jokers J, and hood C, with lugs $f$ and oil-supply pipe, as shown and described, and for the purpose set forth.

JOHN M. CLARK.

Attest:
P. SOUTH,
C. L. HINTON.